United States Patent
Watanabe

(10) Patent No.: US 9,046,189 B2
(45) Date of Patent: Jun. 2, 2015

(54) ELECTROMAGNETIC VALVE

(75) Inventor: Noritaka Watanabe, Okazaki (JP)

(73) Assignees: TOYOOKI KOGYO CO., LTD (JP); JTEKT CORPORATION (JP)

( * ) Notice: Subject to any disclaimer, the term of this patent is extended or adjusted under 35 U.S.C. 154(b) by 388 days.

(21) Appl. No.: 13/503,224

(22) PCT Filed: Oct. 21, 2010

(86) PCT No.: PCT/JP2010/068619
§ 371 (c)(1),
(2), (4) Date: Apr. 20, 2012

(87) PCT Pub. No.: WO2011/049178
PCT Pub. Date: Apr. 28, 2011

(65) Prior Publication Data
US 2012/0199775 A1 Aug. 9, 2012

(30) Foreign Application Priority Data
Oct. 21, 2009 (JP) .................................. 2009-242543

(51) Int. Cl.
*H01F 7/08* (2006.01)
*F16K 31/10* (2006.01)
(Continued)

(52) U.S. Cl.
CPC ........... *F16K 31/0693* (2013.01); *F16K 31/408* (2013.01); *H01M 8/04089* (2013.01); *H01M 2250/20* (2013.01); *Y02E 60/50* (2013.01); *F16K 31/0655* (2013.01); *Y02T 90/32* (2013.01)

(58) Field of Classification Search
CPC ............ F16K 31/0655; F16K 31/0658; F16K 39/024; G05D 16/2093; H01M 2250/20; H01M 8/04089

USPC .............. 251/30.03, 30.04, 129.07, 129.15, 251/30.01; 335/296
See application file for complete search history.

(56) References Cited

U.S. PATENT DOCUMENTS 2,622,618 A * 12/1952 Ghormley .................. 251/30.03
3,076,630 A * 2/1963 Hammond ................. 251/30.03
(Continued)

FOREIGN PATENT DOCUMENTS

| JP | 2003240148 | 8/2003 |
|----|------------|--------|
| JP | 2003329161 | 11/2003 |
| JP | 2007002930 | 1/2007 |

OTHER PUBLICATIONS

International Search Report dated Jan. 25, 2011 issued in PCT Patent Application No. PCT/JP20101068619, 3 pages.
(Continued)

*Primary Examiner* — Marina Tiet Jen
*Assistant Examiner* — Seth W Mackay-Smith
(74) *Attorney, Agent, or Firm* — Grossman Tucker Perreault & Pfleger PLLC

(57) ABSTRACT

An electromagnetic valve includes: a valve main body including an inlet and an outlet of a fluid; a valve body to be seated on a valve seat provided between the inlet and the outlet; a movable iron core separating the valve body from the valve seat to communicate the inlet with the outlet; and a fixed iron core attracting the movable iron core by energization of a coil to axially drive the movable iron core. The valve main body includes an insertion hole into which a guide member is inserted and a stopper portion to stop the guide member biased by a pressure of the fluid. The guide member includes a sliding hole in which the movable iron core is axially movable, and is arranged in the insertion hole in a slidable manner with respect to the valve main body to be biased by the pressure of the fluid.

12 Claims, 3 Drawing Sheets

(51) Int. Cl.
  *F16K 31/06* (2006.01)
  *F16K 31/40* (2006.01)
  *H01M 8/04* (2006.01)

(56) References Cited

U.S. PATENT DOCUMENTS

| | | | | |
|---|---|---|---|---|
| 3,100,103 | A * | 8/1963 | Bullard | 251/30.03 |
| 5,735,582 | A * | 4/1998 | Eith et al. | 303/119.2 |
| 6,209,970 | B1 * | 4/2001 | Kamiya et al. | 303/119.2 |
| 6,325,296 | B1 * | 12/2001 | Dayton | 236/92 B |
| 6,405,743 | B1 * | 6/2002 | Spryshak et al. | 137/1 |
| 6,530,528 | B2 * | 3/2003 | Breyer et al. | 236/92 B |
| 7,730,905 | B2 * | 6/2010 | Suzuki et al. | 137/613 |

OTHER PUBLICATIONS

Japanese Office Action dated Aug. 20, 2013 issued in corresponding Japanese Patent Application No. 2009-242543 with English language translation, 6 pages.

International Preliminary Report on Patentability dated May 15, 2012 issued in PCT Patent Application No. PCT/JP2010/068619, 7 pp.

* cited by examiner

ELECTROMAGNETIC VALVE

CROSS-REFERENCE TO RELATED APPLICATIONS

This international application claims the benefit of Japanese Patent Application No. 2009-242543 filed Oct. 21, 2009 in the Japan Patent Office, the disclosure of which is incorporated herein by reference.

TECHNICAL FIELD

The present invention relates to an electromagnetic valve, in which a movable iron core is attracted to a fixed iron core by energization of a coil, and a valve body is moved by a movement of the movable iron core, to thereby control flow of a fluid. The present invention particularly relates to an electromagnetic valve that controls flow of a high-pressure hydrogen gas to be supplied from a gas tank equipped in a fuel cell car and filled with the high-pressure hydrogen gas.

BACKGROUND ART

In conventional techniques, for example, an electromagnetic valve as described in Patent Document 1 is known as an electromagnetic valve that controls flow of a high-pressure hydrogen gas to be supplied from a gas tank equipped in a fuel cell car and filled with the high-pressure hydrogen gas. In the electromagnetic valve, a movable iron core is fittingly inserted into a tubular guide member in an axially slidable manner. When the movable iron core is attracted to a fixed iron core by energization of a coil, and a valve body axially slides to separate from a valve seat, to thereby open a valve. When the coil is de-energized, the movable iron core separates from the fixed iron core due to a biasing force of a spring, and the valve body is pressed by the movable iron core to he seated on the valve seat, to thereby close the valve.

PRIOR ART DOCUMENTS

Patent Document

Patent Document 1: Japanese Unexamined Patent Application Publication No. 2003-240148

SUMMARY OF THE INVENTION

Problems to be Solved by the Invention

Such an electromagnetic valve according to the conventional techniques involves the following problem: Since the fixed iron core is fixed to the guide member by welding, while the guide member is fastened to the valve main body with screws, even an acting force acting on the fixed core, which is an acting force generated due to a pressure of the high-pressure hydrogen gas also acts on the guide member as a tensile force in an axial direction of the guide member. Accordingly, to control flow of a higher-pressure hydrogen gas with the electromagnetic valve, a radial thickness of the guide member must be increased so as to improve strength against the tensile force. As a result, the guide member in the conventional electromagnetic valve has a larger radial thickness, and thus the valve itself should have a larger size.

In the electromagnetic valve of the present invention, it is preferable that a tensile force which acts on the guide member in the axial direction can be reduced.

Means for Solving the Problems

An electromagnetic valve in a first aspect of the present invention includes: a valve main body that includes an inlet and an outlet of a fluid; a valve body that is to he seated on a valve seat provided between the inlet and the outlet; a movable iron core that separates the valve body from the valve seat to thereby communicate the inlet with the outlet; and a fixed iron core that attracts the movable iron core by energization of a coil to thereby axially drive the movable iron core. The valve main body includes an insertion hole into which a guide member is inserted. The guide member includes a sliding hole in which the movable iron core is axially movable, and is arranged in the insertion hole in a slidable manner with respect to the valve main body to he biased by a pressure of the fluid. The valve main body includes a stopper portion to stop the guide member biased by the pressure of the fluid.

In a second aspect of the present invention, the configuration may be such that the stopper portion is a cap member that closes an opening of the insertion hole, the fixed iron core is arranged between the movable iron core and the cap member, the insertion hole communicates with the inlet, and the guide member and the fixed iron core are biased in a same direction by the pressure of the fluid introduced from the inlet.

In a third aspect of the present invention, the guide member and the fixed iron core may be adapted to be biased toward the cap member by the pressure of the fluid introduced from the inlet.

In a fourth aspect of the present invention, the fixed iron core may include an abutment portion which an end of the guide member on a side of the cap member abuts, and the fixed iron core may be biased toward the cap member by the guide member through the abutment portion.

In a fifth aspect of the present invention, the insertion hole may include a bottom surface extending in a radial direction of the guide member, and may include an action chamber, which communicates with the inlet and into which the fluid is introduced, formed between the bottom surface and the guide member.

In a sixth aspect of the present invention, a pilot passage that penetrates the valve body in an axial direction thereof and a pilot valve body that opens and closes the pilot passage may further he provided. The configuration may be such that the movable iron core includes a housing hole to house the valve body, the valve body is housed in the housing hole in an axially movable manner, and the movable iron core moves the pilot valve body to thereby open the pilot passage, and subsequently moves the valve body housed in the housing hole to thereby communicate the inlet with the outlet.

Effects of The Invention

According to the invention in the first aspect, since the guide member is not fixed to the valve main body, no tensile force acts on the guide member even when a high-pressure fluid acts on the guide member in the insertion hole. Accordingly, an effect can be achieved that, even in a case where the pressure of the high-pressure hydrogen gas is further increased, it is possible to suppress an increase in radial thickness of the guide member and thus is possible to suppress upsizing of the electromagnetic valve.

According to the invention in the second aspect, since the guide member and the fixed iron core are biased in the same direction, no tensile force acts on the guide member even when the fixed iron core and the guide member are fixed together.

According to the invention in the third aspect, since the guide member and the fixed iron core are biased toward the cap member by the pressure of the fluid, the guide member biased by the pressure of the fluid can be received by use of a simple structure.

According to the invention in the fourth aspect, by providing the abutment portion, which the guide member abuts, in the fixed iron core, the guide member and the fixed iron core may he easily biased in a same direction. According to the invention in the fifth aspect, by forming the action chamber, the guide member may certainly be biased toward the cap member. According to the invention in the sixth aspect, the valve body is movably housed in the housing hole formed in the movable iron core, an axial length may be reduced and downsizing may be achieved even in a case of a pilot-operated electromagnetic valve.

EXPLANATION OF REFERENCE NUMERALS

1 . . . valve main body, 2 . . . outlet, 4 . . . insertion hole, 6 . . . larger diameter hole, 8 . . . inlet, 10 . . . guide member, 16 . . . action chamber, 22 . . . smaller outlet, 24 . . . attachment hole, 26 . . . sliding hole, 28 . . . smaller inlet, 32 . . . valve seat, 34 . . . valve seat member, 36 . . . movable iron core, 38 . . . housing hole, 42 . . . valve body, 50 . . . pilot valve seat, 52 . . . pilot valve seat member, 54 . . . pilot valve body, 56 . . . fixed iron core, 58 . . . biasing member, 62 . . . engagement member, 70 . . . coil, 72, 74, 75 . . . yoke, 76 . . . cap member

Mode For Carrying Out The Invention

Figure 1:
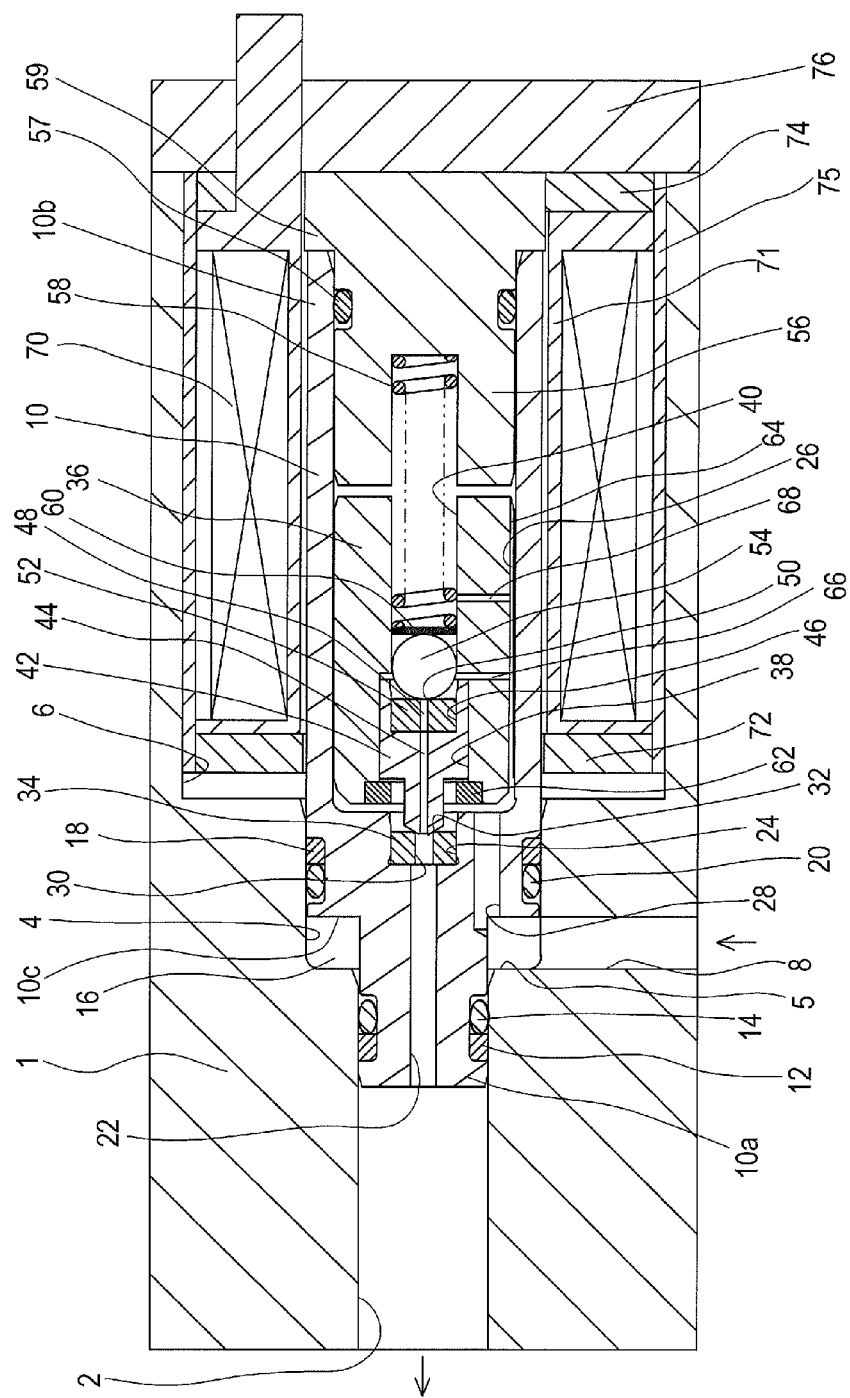
FIG. 1 is a cross-sectional view of an electromagnetic valve as one embodiment of the present invention.

An embodiment for carrying out the present invention will be described in detail hereinafter with reference to the drawings. In FIG. 1, a numeral 1 represents a valve main body made of aluminum. An outlet 2 is bored at one end (a left end in FIG. 1) of the valve main body 1. Also, in the valve main body 1, an insertion hole 4 having a larger inside diameter than the outlet 2 is formed coaxially with. the outlet 2 and connected to the outlet 2. The insertion hole 4 includes a larger diameter portion 6. The larger diameter portion 6 is provided so as to be opened at the other end (right end side in FIG. 1) of the valve main body 1. A bottom surface 5 of the insertion hole 4 on a side of the outlet 2 includes an inlet 8 bored in a radial direction.

A guide member 10 is inserted into the inlet 2 and the insertion hole 4. The guide member 10 includes a smaller diameter portion 10a to be inserted into the inlet 2, and a larger diameter portion 10b to be disposed to abut an inner circumference surface of the insertion hole 4. Also, an end surface of the larger diameter portion 10b, the end surface radially extending further than the smaller diameter portion 10a on a side of the larger diameter portion 10b connecting to the smaller diameter portion 10a, is formed as a pressure receiving surface 10c. In the present embodiment, the guide member 10 is inserted into the outlet 2 and the insertion hole 4 in a slidable manner. The smaller diameter portion 10a is inserted into the outlet 2 in a sealed manner with an O-ring 14 backed up with a backup-ring 12. The guide member 10 is formed of a nonmagnetic material which is resistant against hydrogen embrittlement, such as SUS316L, SUH660 (JIS), etc.

The smaller diameter portion 10a. is inserted into the outlet 2 such that a part of the smaller diameter portion 10a projects into the insertion hole 4 by a predetermined length. The smaller diameter portion 10a, the pressure receiving surface 10c, the insertion hole 4, and the bottom surface 5 define an action chamber 16. The action chamber 16 is formed between the bottom surface 5 and the guide member 10. The larger diameter portion 10b is inserted into the insertion hole 4 in a sealed manner with an O-ring 20 backed up with a backup-ring 18.

The smaller diameter portion 10a of the guide member 10 includes a smaller outlet 22 opened toward the outlet 2. Also, the larger diameter portion 10b includes an attachment hole 24 connected to the smaller outlet 22. Further, the larger diameter portion 10b includes a sliding hole 26 connected to the attachment hole 24. The sliding hole 26 is opened at one end (a right end in FIG. 1) of the larger diameter portion 10b The sliding hole 26 has a bottom portion on a side of the attachment hole 24, a smaller inlet 28 is formed from the bottom portion of the sliding hole 26 toward the pressure receiving surface 10c, and the smaller inlet 28 is opened toward the action chamber 16.

A valve seat member 34, which includes a communication hole 30 centrally penetrating the valve seat member 34 and forms a valve seat 32 on a side of the sliding hole 26, is attached to the attachment hole 24. In the present embodiment, the valve seat member 34 is formed of elastically deformable polyimide resin, polyetherether ketone resin, and so on.

A movable iron core 36 formed of a magnetic material is inserted into the sliding hole 26 in an axially slidable manner. The movable iron core 36 is configured to be cylindrical and includes a housing hole 38 formed to penetrate therethrough along a central axis of the movable iron core 36. A portion of the housing hole 38, which is located on a side opposite to the valve seat member 34 and has a smaller inside diameter, is referred to as a smaller diameter portion 40.

An outer circumference of the movable iron core 36 includes a groove 64 formed along an axial direction thereof. Also, the movable iron core 36 includes a connection hole 66 formed to communicate the groove 64 with the housing hole 38. The connection hole 66 is provided at one end (a left end in the figure) of the smaller diameter portion 40 and at a position not to he closed due to sliding of the valve body 42. Further, a communication hole 68 communicating the groove 64 with the smaller diameter portion 40 is provided in the movable iron core 36.

A valve body 42 is inserted into the housing hole 38 in an axially slidable manner. The valve body 42 is formed so as to be seatable on the valve seat 32. An engagement member 62 having an annular shape is pressure-fitted and fixed on a side of the valve seat member 34 in the movable iron core 36. The engagement member 62 is provided in the movable iron core 36 so as to be coaxial with the housing hole 38. A front end of the valve body 42 passes through an inside of the engagement member 62 and projects toward the valve seat member 34. it is configured such that when the movable iron core 36 slides toward opposite to the valve seat member 34, the engagement member 62 abuts the valve body 42 to thereby cause the valve body 42 to separate from the valve seat 32.

The valve body 42 includes a pilot passage hole 44 formed along a central axis of the valve body 42. The pilot passage hole 44 is opened toward the valve seat 32. It is configured such that in a state where the valve body 42 is seated on the valve seat 32, the communication hole 30 in the valve seat member 34 and the pilot passage hole 44 in the valve body 42 communicate with each other, and an upstream side and a downstream side of the valve seat 32 communicate with each other.

The valve body 42 includes an attachment hole 46 formed to be connected to the pilot passage hole 44. The attachment hole 46 houses a pilot valve seat member 52 including a pilot valve seat 50. The pilot valve seat member 52 includes a communication hole 48 formed to penetrate the pilot valve seat member 52 along a central axis thereof. In the present embodiment, the pilot valve seat member 52 is formed of elastically deformable polyimide resin, polyetherether ketone resin, and so on.

A pilot valve body 54 constituted by a steel ball is pressure-fitted and fixed in the smaller diameter portion 40 of the movable iron core 36. The pilot valve body 54 is provided to be seatable on the pilot valve seat 50 by a relative movement between the valve body 42 and the movable iron core 36.

A fixed iron core 56 made of a magnetic material is pressure-fitted and fixed in the sliding hole 26 of the guide member 10. The fixed iron core 56 faces the movable iron core 36 along the axial direction thereof. The fixed iron core 56 includes a flange-shaped abutment portion 59 formed to protrude radially, and an end of the guide member 10 on a side of a cap member 76 described. later abuts the abutment portion 59. Also, leakage prevention is realized by an O-ring 57 fitted around the fixed iron core 56.

A biasing member 58 using a coil spring is placed between the pilot valve body 54 and the fixed iron core 56. The biasing member 58, whose end is inserted into the smaller diameter portion. 40 of the housing hole 38, biases, through a disk 60, the pilot valve body 54 in a direction to be seated on the pilot valve seat 50.

When the pilot valve body 54 becomes seated on the pilot valve seat 50 due to a biasing force of the biasing member 58, the valve body 42 is pressed by the pilot valve body 54 to be seated on the valve seat 32. Then, a space is formed between an end of the movable iron core 36 and an end of the fixed iron core 56.

When the movable iron core 36 moves toward the fixed iron core 56, the pilot valve body 54 first separates from the valve seat 50, and subsequently the annular engagement member 62 which is pressure-fitted and fixed in the movable iron core 36 abuts the valve body 42 to cause the valve body 42 to separate from the valve seat 32. Then, the end of the movable iron core 36 abuts the end of the fixed iron core 56, and thereby movement of the movable iron core 36 is stopped.

A coil bobbin 71 having a coil 70 is mounted around an outer circumference of the larger diameter portion 10b of the guide member 10. The coil bobbin 71 is provided to be inserted into the larger diameter portion 6. An annular yoke 72 and an annular yoke 74 made of magnetic materials are disposed respectively at both ends of the coil bobbin 71.

The coil bobbin 71 is housed in a cylindrical yoke 75 made of a magnetic material. The annular yoke 72 and the annular yoke 74 are pressure-fitted and fixed in an integral manner respectively at both ends of the yoke 75. The yoke 74 on an open side of the larger diameter portion 6 is pressure-fitted and fixed so as to abut the abutment portion 59 of the fixed iron core 56.

Figure 2:
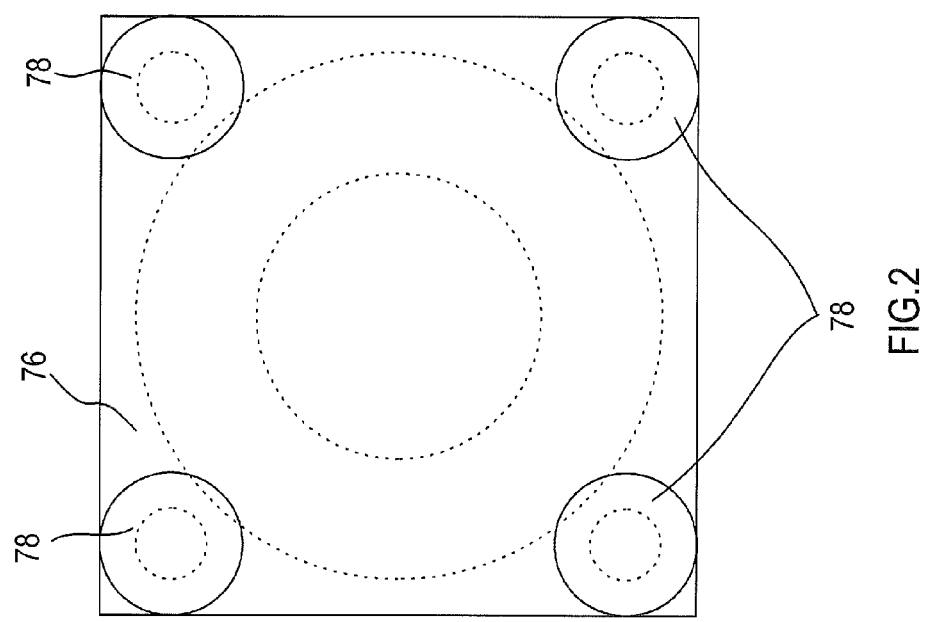
FIG. 2 is a side elevational view of the electromagnetic valve of the present embodiment.

The larger diameter portion 6 of the insertion hole 4 is closed by the cap member 76 as a stopper portion, and the cap member 76 is fixed to the valve main body 1 with a bolt 78 (see FIG. 2). It is configured such that when the coil bobbin 71 and the yokes 72, 74, 75 which are integrally provided are inserted into the larger diameter portion 6, a gap is formed between a bottom portion of the larger diameter portion and ends of the yoke 72 and the yoke 75.

In the present embodiment, energization of the coil 70 results in formation of a magnetic circuit in the yoke 72, the movable iron core 36, the fixed iron core 56, the yoke 74 and the yoke 75. It is configured such that, even when one end of the movable iron core 36 abuts the end of the fixed iron core 56, the other end of the movable iron core 36 projects sufficiently from the yoke 72. if a front end of the movable iron core 36 retracts from the yoke 72 toward the fixed iron core 56, a magnetic force is lowered. Since the movable iron core 36 projects from the yoke 72 even when the movable iron core 36 moves in the housing hole 38 at the time of valve opening and closing, the magnetic force is not lowered.

An explanation will next be given of an operation of the magnetic valve in the present embodiment.

When a high-pressure hydrogen gas as a fluid is supplied into the inlet 8 from a not-shown gas tank, the high-pressure hydrogen gas is introduced into the action chamber 16 through the inlet 8, and also the high-pressure hydrogen gas is introduced into the sliding hole 26 from the action chamber 16 through the smaller inlet 28.

A pressure of the high-pressure hydrogen gas introduced into the action chamber 16 acts on a pressure receiving surface 10c, and thereby the guide member 10 is biased toward the cap member 76. The guide member 10 presses the fixed iron core 56 against the cap member 76, and also biases the coil bobbin 71 and the coil 70 toward the cap member 76 through the yoke 74, 75, and 72, which are integral with the fixed iron core 56. The biasing force is received by the cap member 76 fixed to the valve main body with the bolt 78.

Accordingly, with a configuration in which the guide member 10 is inserted into the outlet 2 and the insertion hole 4 with the guide member 10 not being fixed to the valve main body 1 with a screw, the guide member 10 and the fixed iron core 56 are pressed against the cap member 76 to be positioned thereat when the high-pressure hydrogen gas is introduced into the action chamber 16. Specifically the guide member 10 and the fixed iron core 56 are fixed so as not to move axially.

The high-pressure hydrogen gas introduced into the sliding hole 26 of the guide member 10 is also introduced into the space between the movable iron core 36 and the fixed iron core 56 through the groove 64, and a pressure by the high-pressure hydrogen gas acts in an equilibrium manner in an axial direction of the movable iron core 36. Then, the movable iron core 36 is biased by the biasing force of the biasing member 58, and the valve body 42 is seated on the valve seat 32 through the pilot valve body 54, and thereby a valve-closed state is maintained.

A force resulting from the pressure of the high-pressure hydrogen gas introduced into the sliding hole 26 acts on a bottom surface of the sliding hole 26 of the guide member 10. Specifically, a force to press the guide member 10 in a direction opposite to a side where the cap member 76 is provided acts on the guide member 10. On the other hand, since it is configured such that the receiving surface 10c has an area larger than an area of the bottom surface of the sliding hole 26, the guide member 10 is biased toward the cap member 76 due to a difference in pressure based on a difference between these areas.

Also, the pressure by the high-pressure hydrogen gas introduced into the sliding hole 26 acts on a surface, facing the movable iron core 36, of the fixed iron core 56. Specifically, a force to press the fixed iron core 56 toward. the cap member 76 acts on the fixed iron core 56. As a result, both the guide member 10 and the fixed iron core 56 are pressed toward the cap member 76. With this configuration, a fixation strength of the fixed iron core 56 at a position where the fixed iron core 56 is pressure-fitted and fixed is allowed to be lower, as compared with a conventional electromagnetic valve in which an axial tensile force acts at a welding-fixed position between a guide member and a fixed iron core, When the coil 70 is energized, the movable iron core 36 is attracted to the fixed iron core 56. First, the movable iron core 36 together with the pilot valve body 54 slide toward the fixed iron core 56 against a biasing force of the biasing member 58 and a force acting on the pilot valve body 54 (specifically, an acting force which results from the pressure of the high-pressure hydrogen gas, and acts on the pilot valve body 54 in a direction of causing the pilot valve body 54 to be seated on the valve seat 50). As a result, the pilot valve body 54 separates from the valve seat 50, and the high-pressure hydrogen gas passes, in order, through the inlet 8, the insertion hole 4, the smaller inlet 28, the sliding hole 26, the groove 64, the. connection hole 66, the housing hole 38, the communication hole 48 and the pilot passage hole 44, and flows into the communication hole 30 and the smaller outlet 22, to thereby increase pressures in the communication hole 30 and the smaller outlet 22. Consequently, a differential pressure between an upstream and a downstream of the valve body 42 is reduced, and thereby an acting force on the valve body 42 by the high-pressure hydrogen gas is reduced.

After the pilot valve body 54 separates from the valve seat 50 and the differential pressure between the upstream and the downstream of the valve body 42 is reduced, the movable iron core 36 slides toward the fixed iron core 56, Once the valve body 42 abuts the engagement member 62 of the movable iron core 36, the valve body 42 moves with the movable iron core 36, and the valve body 42 separates from the valve seat 32 to thereby open the valve. As a result, the inlet 8 communicates with the outlet 2 through the smaller inlet 28 and the sliding hole 26 of the guide member 10, and the communication hole 30 of the valve seat member 34, and thereby the high-pressure hydrogen gas is supplied from the inlet 8 to the outlet 2. At that time, the communication hole 68 prevents the smaller diameter portion 40 of the housing hole 38 from becoming a closed space.

Even when the valve is opened, the high-pressure hydrogen gas is introduced into the action chamber 16, and the pressure of the high-pressure hydrogen gas acts on the pressure receiving surface 10c. Accordingly, the guide member 10 is biased toward the cap member 76, and therefore the guide member 10 does not move in a direction opposite to the cap member 76.

When the coil 70 is de-energized, the pilot valve body 54 presses the valve body 42 due to the biasing force of the biasing member 58. As a result, the valve body 42 becomes seated on the valve seat 32 to close the valve.

As described above, since the guide member 10 is not fixed to the valve main body 1, no tensile force acts on the guide member 10 even when a high-pressure fluid acts on. the guide member 10 in the insertion hole 4. Accordingly, even in a case where the pressure of the high-pressure hydrogen gas is further higher, it is not required to increase a radial thickness of the guide member 10, and therefore it is possible to suppress upsizing of the electromagnetic valve. Also, since the guide member 10 and the fixed iron core 56 are biased in a same direction, no tensile force acts on the guide member 10 even when the fixed iron core 56 and the guide member 10 are fixed together.

The guide member 10 and the fixed iron core 56 are biased toward the cap member 76 due to the pressure of the fluid, and the guide member 10 biased due to the pressure of the fluid can be received by a simple configuration. Also, provision of the abutment portion 59, which the guide member 10 may abut, in the fixed iron core 56 facilitates biasing of the guide member 10 and the fixed iron core 56 in the same direction. Further, forming of the action chamber 16 allows secure biasing of the guide member 10 toward the cap member 76. Moreover, since the valve body 42 is movably housed in the housing hole 38 formed in the movable iron core 36, reduction of an axial length and thus downsizing of an entire electromagnetic valve may be achieved.

In addition, even in a case where the valve main body 1 and the guide member 10 are made of respective materials having different thermal expansion coefficients, and expansion and contraction of the valve main body 1 due to temperature changes is larger than that of the guide member 10, relative slippage occurs between the guide member 10 and the outlet 2 or the insertion hole 4 of the valve main body 1. Thus, generation of an excessive thermal stress in the valve main body 1, the guide member 10, or the cap member 76 may be suppressed.

Figure 3:
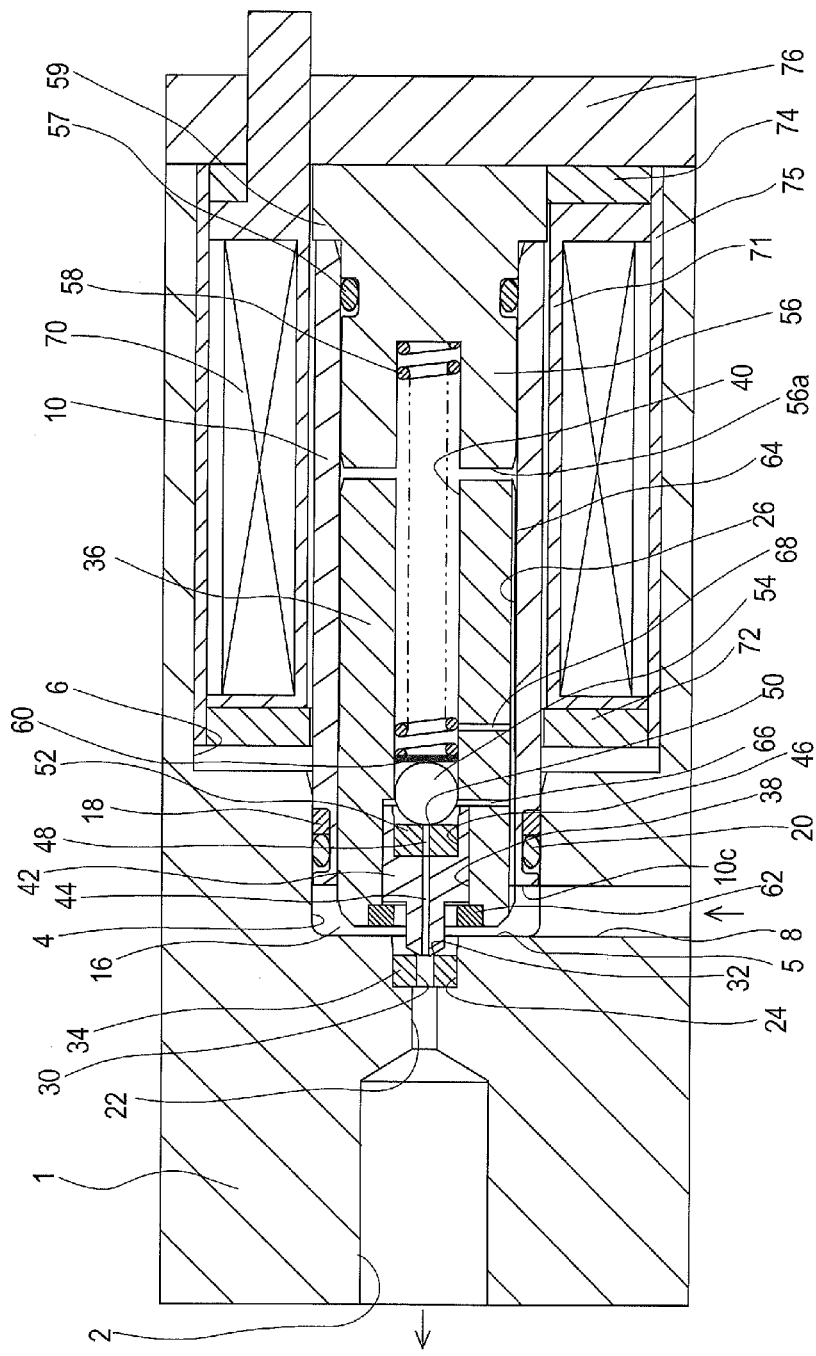
FIG. 3 is a cross-sectional view of an electromagnetic valve of a second embodiment.

Next, an explanation will be provided of an electromagnetic valve in a second embodiment which is different from the above-described first embodiment based on FIG. 3. The same members as in the first embodiment are assigned the same numerals, and no detailed description thereof will be provided.

In the second embodiment, as shown in FIG. 3, the sliding hole 26 is formed to penetrate the guide member 10, and the attachment hole 24 is formed in the valve main body 1 so as to be coaxial with the outlet 2. The outlet 2 and the attachment hole 24 communicate with each other through the smaller outlet 22. Also, it is configured such that the valve seat member 34 is housed in. the attachment hole 24, and the valve 42 is seatable on the valve seat 32.

According to the second embodiment, the action chamber 16 is formed by the insertion hole 4 and the pressure receiving surface 10c of the guide member 10. Similarly, in the second embodiment, when the high-pressure hydrogen gas is introduced into the action chamber 16, the guide member 10 is biased toward the cap member 76, and the fixed iron core 56 is pressed against the cap member 76 due to the action of the pressure of the high-pressure hydrogen gas.

Also, the high-pressure hydrogen gas is introduced from the action chamber 16 into the sliding hole 26, and thereby the pressure of the high-pressure hydrogen gas acts on the pressure receiving surface 56a of the fixed iron core 56. As a result, the fixed iron core 56 is biased toward the cap member 76, and the fixed iron core 56 is pressed against the cap member 76. Since the fixed iron core 56 is pressure-fitted and fixed in the guide member 10, the guide member 10 is pressed toward the cap member 76 together with the fixed iron core 56.

Also in the second embodiment, since the guide member 10 is not fixed to the valve main body 1, no tensile force acts on the guide member 10. Accordingly, even in a case where the pressure of the high-pressure hydrogen gas is further higher, it is not required to increase a radial thickness of the guide member 10, and therefore it is possible to suppress upsizing of the electromagnetic valve.

Moreover, according to the second embodiment, the guide member 10 may have a simple cylindrical shape, and therefore the guide member 10 can be easily manufactured.

The pilot valve body 54 is not limited to a steel ball, but may be shaped like a poppet valve. While a semi-pilot operated electromagnetic valve is used as an example in the present embodiment, the electromagnetic valve is not limited to this example, but may be a direct operated electromagnetic valve which is not provided with the pilot valve body 54, the pilot valve seat member 52, and so on, or may be a pilot operated electromagnetic valve.

Also, while the fixed iron core 56 is pressure-fitted and fixed in the sliding hole 26 of the guide member 10 in the present embodiment, the fixed iron core 56 is not necessarily required to be pressure-fitted and fixed, but may be movably inserted. In this case, it is preferable to configure such that an end of the guide member 10 abuts the abutment portion 59 of the fixed iron core 56, and thereby the abutment portion 59 is sandwiched by the guide member 10 and the cap member 76. Alternatively, the guide member 10 and the fixed iron core 56 may be fixed together by welding.

The present invention should not at all be limited to the above-described embodiments, but may be practiced in various forms without departing from the scope of the invention.

What is claimed is:

1. An electromagnetic valve, comprising:
    a valve main body that includes an inlet and an outlet of a fluid;
    a valve body that is to be seated on a valve seat provided between the inlet and the outlet;
    a movable iron core that separates the valve body from the valve seat to thereby communicate the inlet with the outlet; and
    a fixed iron core that attracts the movable iron core by energization of a coil to thereby axially drive the movable iron core,
    wherein the valve main body includes an insertion hole into which a guide member is inserted,
    wherein the guide member includes a sliding hole in which the movable iron core is axially movable, and is arranged in the insertion hole in a slidable manner with respect to the valve main body to be biased by a pressure of the fluid,
    wherein the valve main body includes a stopper portion to stop the guide member biased by the pressure of the fluid,
    wherein the stopper portion is a cap member that closes an opening of the insertion hole,
    wherein the fixed iron core is arranged between the movable iron core and the cap member,
    wherein the insertion hole communicates with the inlet, and
    wherein the guide member and the fixed iron core are adapted to be biased in a same direction by the pressure of the fluid introduced from the inlet.

2. The electromagnetic valve according to claim 1, wherein the guide member and the fixed iron core are biased toward the cap member by the pressure of the fluid introduced from the inlet.

3. The electromagnetic valve according to claim 2,
    wherein the fixed iron core includes an abutment portion which an end of the guide member on a side of the cap member abuts, and
    wherein the fixed iron core is biased toward the cap member by the guide member through the abutment portion.

4. The electromagnetic valve according to claim 2, wherein the insertion hole includes a bottom surface extending in a radial direction of the guide member, and includes an action chamber, which communicates with the inlet and into which the fluid is introduced, formed between the bottom surface and the guide member.

5. The wherein electromagnetic valve according to claim 1, further comprising:
    a pilot passage that penetrates the valve body in an axial direction thereof; and
    a pilot valve body that opens and closes the pilot passage,
    wherein the movable iron core includes a housing hole to house the valve body,
    wherein the valve body is housed in the housing hole in an axially movable manner,
    wherein the movable iron core moves the pilot valve body to thereby open the pilot passage, and subsequently moves the valve body housed in the housing hole to thereby communicate the inlet with the outlet.

6. The electromagnetic valve according to claim 5,
    wherein an outer circumference of the movable iron core includes a groove, and
    wherein the movable iron core includes a connection hole to communicate the groove with the housing hole.

7. The electromagnetic valve according to claim 6,
    wherein the movable iron core includes:
        a smaller diameter portion in which the pilot valve body is pressure-fitted and fixed; and
        a communication hole to communicate the groove with the smaller diameter portion.

8. The electromagnetic valve according to claim 7, wherein the connection hole is provided at one end of the smaller diameter portion and at a position not to be closed by the valve body.

9. The electromagnetic valve according to claim 5,
    wherein an outer circumference of the movable iron core includes a groove, and
    wherein the movable iron core includes:
        a smaller diameter portion in which the pilot valve body is pressure-fitted and fixed; and
        a communication hole to communicate the groove with the smaller diameter portion.

10. The electromagnetic valve according to claim 8, wherein the connection hole is provided at one end of the smaller diameter portion and at a position not to be closed by the valve body.

11. An electromagnetic valve, comprising:
    a valve main body that includes an inlet and an outlet of a fluid;
    a valve body that is to be seated on a valve seat provided between the inlet and the outlet;
    a movable iron core that separates the valve body from the valve seat to thereby communicate the inlet with the outlet; and
    a fixed iron core that attracts the movable iron core by energization of a coil to thereby axially drive the movable iron core,
    wherein the valve main body includes an insertion hole into which a guide member is inserted,
    wherein the guide member includes a sliding hole in which the movable iron core is axially movable, and is arranged in the insertion hole in a slidable manner with respect to the valve main body to be biased by a pressure of the fluid,
    wherein the valve main body includes a stopper portion to stop the guide member biased by the pressure of the fluid, and wherein an engagement member having an annular shape is pressure-fitted and fixed in the movable iron core, and a front end of the valve body passes through an inside of the engagement member and projects toward the valve seat member.

12. An electromagnetic valve, comprising:
    a valve main body that includes an inlet and an outlet of a fluid;
    a valve body that is to be seated on a valve seat provided between the inlet and the outlet;

a movable iron core that separates the valve body from the valve seat to thereby communicate the inlet with the outlet; and a fixed iron core that attracts the movable iron core by energization of a coil to thereby axially drive the movable iron core, wherein the valve main body includes an insertion hole into which a guide member is inserted, wherein the guide member includes a sliding hole in which the movable iron core is axially movable, and is arranged in the insertion hole in a slidable manner with respect to the valve main body to be biased by a pressure of the fluid, wherein the valve main body includes a stopper portion to stop the guide member biased by the pressure of the fluid, and wherein the fixed iron core is pressure-fitted and fixed in the sliding hole, and the guide member is arranged along with the fixed iron core in the insertion hole in a slidable manner with respect to the valve main body.

* * * * *